W. T. Nichols,
Scraper.
No. 112,835. Patented Mar. 21, 1871.

UNITED STATES PATENT OFFICE.

WILLIAM T. NICHOLS, OF CHICAGO, ILLINOIS.

IMPROVEMENT IN ROAD-SCRAPERS.

Specification forming part of Letters Patent No. 112,835, dated March 21, 1871.

*To all whom it may concern:*

Be it known that I, WILLIAM T. NICHOLS, of Chicago, in the county of Cook and State of Illinois, have invented a new and useful Improvement in Road-Scrapers; and I do hereby declare that the following is a full, clear, and exact description thereof, reference being had to the accompanying drawing, making part of this specification, in which—

Figure 1:
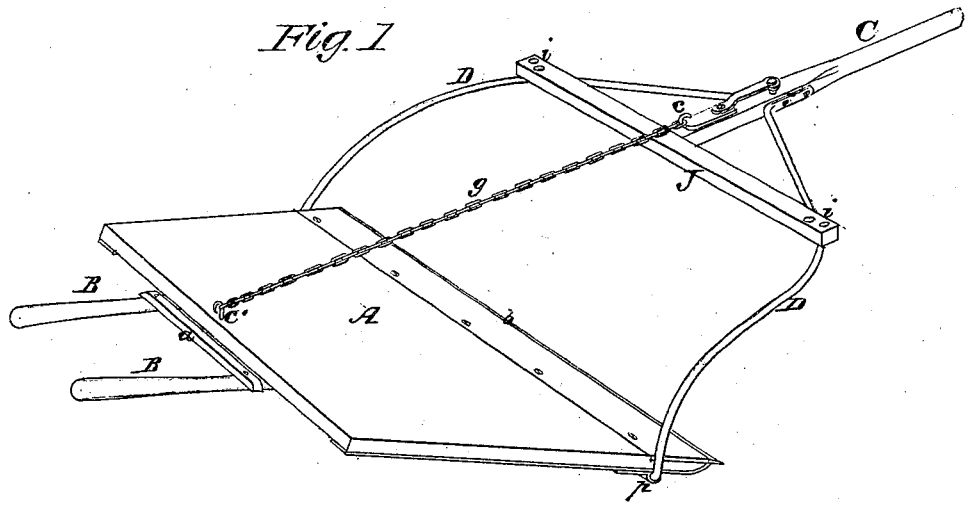
Figure 2:
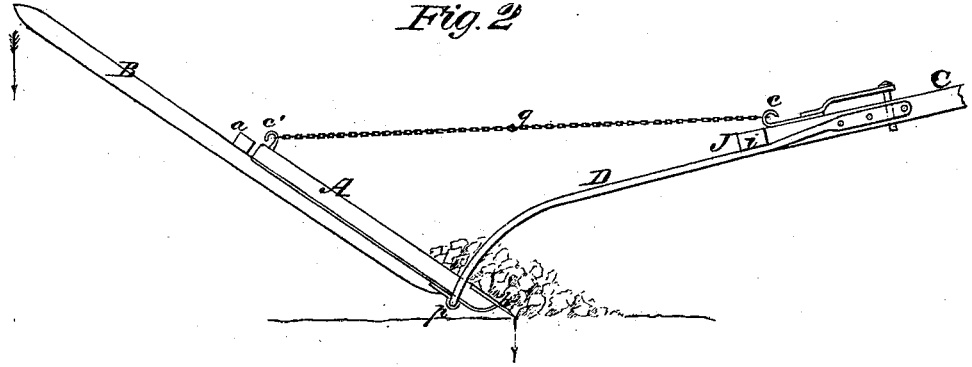

Figure 1 is a perspective view of a road-scraper having my improvement applied to it. Fig. 2 is a side elevation of the same.

Similar letters of reference indicate corresponding parts in both figures.

This invention relates to an improvement on scrapers which are designed for clearing and leveling roads, and which are adapted for being drawn by animals and guided and controlled by persons walking behind them.

The objects of my invention are to afford a person walking behind a scraper facility for holding the scraping-edge down with more or less force upon the surface of the ground, or to force such edge into the ground, while leveling and clearing the same; also, to relieve the attendant from the labor of holding up a load which has been gathered upon a scraper.

To this end the nature of my invention consists in connecting the rear end of the draft-pole to the rear end or edge of the scraper-bed by means of a chain or its equivalent, whereby, during the operation of the scraper, a pressure applied downward upon its handles will be transferred to the scraping-edge, and, also, whereby the rear end of the scraper-bed will be supported in an elevated position without the aid of the operator, as will be hereinafter explained.

The following description of my invention will enable others skilled in the art to understand my invention.

The scraper which I have represented in the accompanying drawing with my improvement applied to it is constructed substantially like the one described and claimed in my Letters Patent of the United States dated on the 22d day of November, 1870, and numbered 109,440.

I shall not, however, confine myself to this particular kind of scraper, as the invention is applicable to other kinds wherein the draft-pole is hinged by a stiff bail to the scraper-bed.

In the drawing, A represents the bed of the scraper, which may be shod on its scraping-edge with a metal wearing-plate, *b*. This bed A is strengthened by means of extensions of the two handles B, which extensions serve as battens. The bar *a*, which is secured to the handles B B just in behind the rear edge of the bed A, serves to strengthen them.

To the back edge of the bed A, near its scraping-edge, staples or eyes *p* are secured, which receive the hooked ends of two pole-rods, D D, and form jointed connections between the pole-rods and scraper-bed. The pole-rods constitute a draft-bail, and their front ends are secured to the sides of the draft-pole C, and also to the ends of a cross-bar, J. The rods D, which form the draft-bail, as above stated, are curved outward and downward from the ends of the bar J, and their hooked ends are received into the staples *p*.

The cross-bar J, which is secured to the rear end of the draft-pole C, serves as a brace for the bail-rods, while those portions of these rods which extend from the pole C to the ends of the said bar serve as braces therefor. The bail-rods are secured to the bar J by staples at *i i*, Fig. 1.

It will be seen from the above description that the draft-bail will hold up the rear end of the draft-pole free from the hind legs of animals when hitched to the machine; also, that a jointed connection is afforded the scraper-bed, which will allow an attendant having hold of handles B B to adjust the rear part of the bed higher or lower, as he may desire, and also to turn the bed over upon the cross-bar J.

I improve this scraper as follows: At *c* an eye or a hook is secured to the draft-pole C, and at *c'* an eye or a hook is secured to the scraper-bed A. To these hooks I attach a chain, *g*, of sufficient length to allow the scraper-bed to assume any desired angle with respect to the surface of the ground when the handles are released. Provision may be made for shortening or lengthening the chain *g* at pleasure.

It will be seen that the chain *g* affords a flexible connection between the draft-pole and the rear elevated part of the scraper-bed, and will sustain the latter in an inclined position, with or without a load upon it, without the aid of the attendant; and while this is the case the flexibility of the chain *g* will allow the attendant to raise the rear part of the scraper-bed at pleasure.

The most important object attained by the use of the said chain is, that the attendant can apply any desired degree of pressure upon the scraper-bed with very little physical exertion, and cause the scraping-edge of bed A to penetrate more or less into the surface of the ground.

Having described my invention, what I claim as new, and desire to secure by Letters Patent, is—

The chain or other like connections $g$, applied between the draft pole C and rear part of the hinged scraper-bed A, substantially as described.

WILLIAM T. NICHOLS.

Witnesses:
P. S. PEAKE,
L. H. ROBINSON.